United States Patent [19]

Brander et al.

[11] Patent Number: 4,556,570

[45] Date of Patent: Dec. 3, 1985

[54] VIENNA SAUSAGE MEAT ANALOG

[75] Inventors: Rita W. Brander, New Rochelle, N.Y.; Teresa A. Raap, Ridgefield, Conn.; Marshall M. Rankowitz, Englishtown, N.J.

[73] Assignee: General Foods Corporation, White Plains, N.Y.

[21] Appl. No.: 593,451

[22] Filed: Mar. 26, 1984

[51] Int. Cl.⁴ .......................... A23J 3/00; A23L 1/04
[52] U.S. Cl. ..................... 426/104; 426/135; 426/574; 426/656; 426/657; 426/804
[58] Field of Search ............... 426/104, 574, 656, 646, 426/657, 802

[56] References Cited

U.S. PATENT DOCUMENTS

| | | | |
|---|---|---|---|
| 3,519,434 | 7/1970 | Schuppner | 426/574 |
| 3,711,291 | 1/1973 | Leidy et al. | 426/574 |
| 3,840,677 | 10/1974 | Leidy et al. | 426/104 X |
| 4,141,999 | 2/1979 | Lolas | 426/104 |

OTHER PUBLICATIONS

Whistler, R. L. et al., Industrial Gums, Academic Press, N.Y., 1973, pp. 570–573.

*Primary Examiner*—Robert Yoncoskie
*Attorney, Agent, or Firm*—Thomas A. Marcoux; Joseph T. Harcarik; Daniel J. Donovan

[57] ABSTRACT

A Vienna sausage analog having desirable textural properties is formed from a dispersion of a fat release emulsion phase in a continuous matrix phase, wherein the continuous matrix phase comprises a heat coagulable protein, locust bean or xanthan gum and a particulate unmodified waxy maize starch of branched chain amylopectin polymers.

12 Claims, No Drawings

VIENNA SAUSAGE MEAT ANALOG

FIELD OF THE INVENTION

The present invention relates to a Vienna sausage analog having textural attributes closely resembling all-meat Vienna sausage. This invention is directed to a Vienna sausage analog prepared from a protein-gum-starch matrix as a first phase in which there is dispersed a fat release emulsion as a second phase, and having desirable textural properties.

BACKGROUND OF THE INVENTION

In recent years, a great deal of effort has been made in the field of protein technology in producing meat substitutes. Extensive development has occurred and is continuing in providing meat analogs based on different formulations.

Feldbrugge, et al., U.S. Pat. No. 3,919,435, patented Nov. 22, 1975, describes a meat analog system which uses a mixture of an encapsulated combination of polymeric carbohydrate gel precursor with an animal fat or vegetable oil and a protein gel precursor containing a mixture of vegetable proteinaceous material and non-vegetable proteinaceous material such as albumen, casein, whey and mixtures thereof.

Leidy, et al., U.S. Pat. No. 3,711,291, patented Jan. 16, 1973, describes a meat analog containing a blend of a combination of non-fibrous vegetable protein and non-vegetable protein of albumen, casein, whey and mixtures thereof with non-rendered animal fat and filler material of specific interest in the production of a juicy sausage analog. Another Leidy, et al. U.S. Pat. No. 3,713,837, patented Jan. 30, 1973, describes a process for making a similar meat analog as produced in U.S. Pat. No. 3,711,291 described above, but also requiring freezing and thawing the product to provide a juicy sausage analog. An additional Leidy, et al. U.S. Pat. No. 3,836,678, patented Sep. 17, 1974, describes a sausage-like food product prepared by autoclaving a gel precursor which is a mixture of a non-fibrous gelable soy protein isolate and material selected from albumen, casein, whey and mixtures thereof.

A fourth Leidy, et al. U.S. Pat. No. 3,719,498 suggests a sausage analog process similar to that described in the three other Leidy, et al. patents noted above. This patent describes a meat analog formed from a protein gel precursor that has incorporated therein frozen non-rendered animal fatty tissue prior to a heating operation which causes gelation of the vegetable protein.

Tewey, et al. U.S. Pat. No. 3,922,352, patented Nov. 25, 1975, describes a process to produce a juicy sausage analog having three distinct phases: a continuous gel phase; a substantially discontinuous fat phase; and a discontinuous chewy proteinaceous phase. In this process, solidified fat particles, particles of a chewy proteinaceous component and a precursor of the continuous gel phase are mixed and coarsely chopped to obtain a substantially uniform heterogeneous distribution of the particulate material within the continuous gel phase precursor. The resulting coarsely chopped blend is formed into a substantially cohesive sausage analog by coagulating the continuous gel phase precursor.

In a copending application, entitled "Meat Analog Having A Protein-Gum-Starch Matrix" and filed on Mar. 26, 1984 in the name of Michael Thomas, et al., Ser. No. 593,213, and incorporated herein by reference, and commonly assigned as the present application, there is described a meat analog which combines water, a heat edible coaguable proteinaceous material, specific hydrocolloids, such as xanthan gum or locust bean gum, a particulate unmodified waxy starch of branched chain amylopectin polymers and a liquid or semi-liquid fat. This meat analog resembles and duplicates, in essential physical and taste characteristics, a wide variety of natural animal meat cuts such as bacon, steak, pork chops, etc., as well as meat systems reprocessed and reformulated with other components as in a sausage product. All of the above patent and patent application references describe satisfactorily meat and/or sausage analogs. With respect to the present invention, is has now been found that if the meat analog of the copending application, described above, is used in a first phase of an analog product, in combination with a fat release emulsion in a second phase as described below, a Vienna sausage analog having improvements in juiciness, snap and flavor, while also having natural qualities such as those of an all-meat product, is achieved.

SUMMARY OF THE INVENTION

The present invention is directed to an improved Vienna sausage analog using and intimately blended two-phase system wherein particles of a fat release emulsion phase are dispersed in a continuous matrix phase. The first, or continuous matrix, phase uses a combination of water, an edible heat-coagulable proteinaceous material, specific hydrocolloids such as xanthan gum or locust bean gum, a specific type of starch, i.e., a finely divided unmodified waxy maize starch of branched chain amylopectin polymers and a fat which is a liquid or semi-liquid, especially at room temperature. The second, or fat release emulsion, phase comprises a vegetable oil, water and non-vegetable protein selected from the group consisting of albumen, casein, whey and combinations thereof. The resulting sausage analog has the textural properties of tenderness, cohesiveness, chewiness, juiciness, snap and flavor approaching all natural meat sausage or frankfurter products.

DETAILED DESCRIPTION OF THE INVENTION

A sausage analog is formulated and processed so as to duplicate as closely as possible natural meat based products that are initially formed into an aqueous emulsion system. In preparing these natural meat based products, the meat emulsion is heated which results in gelation, which introduces a degree of rigidity to the product. The initial meat emulsion with its water component, has flow characteristics enabling it to be readily shaped, as in a casing, prior to gelation to a stable physical form. Examples of such sausages are bologna, olive loaf, frankfurters, Vienna sausages and the like.

The Vienna sausage analog of this invention utilizes two phases. In the first phase, comprising about 50 to about 90 weight percent of the total product, the ingredients include water, edible heat coagulable proteinaceous material, specific hydrocolloids, a specific starch, a liquid or semi-liquid fat as well as salt, flavors and the like. The second phase is a fat release emulsion. When these two phases are blended so as to provide a dispersion of the fat release emulsion phase in the continuous matrix phase, an improved Vienna sausage analog is produced.

In the first phase, a heat coagulable proteinaceous material is used. The protein must be an edible protein material since it is to be incorporated in sausage analog products which are designed for ingestion by humans. The usual source of such protein is vegetable matter, however, a non-vegetable protein, preferably egg albumen, but also including casein, lactalbumin, whey and combinations thereof, may also be employed alone or in combination with one another. Examples of suitable vegetable protein sources are soybeans, safflower seed, corn, peanuts, wheat, peas, sunflower seed, cottonseed, coconut, rapeseed, sesame seed, leaf proteins and the like. Single cell proteins such as yeast may also be used. Generally, if the protein source is a vegetable protein, the protein, prior to use, is placed in a relatively pure form by procedures well known in the art. The amount of protein in the finished sausage analog products can range from about 5 to about 50 weight percent, preferably from about 10 to about 30 weight percent. In this invention a soy isolate is the preferred vegetable protein.

A highly desirable feature of the compositions of this invention is the fact that up to about 30 weight percent of the edible heat coagulable protein can be replaced by an edible non-heat coagulable protein and not effect the desired properties of the sausage analog. Suitable edible non-heat coagulable protein include soy protein, gelatin, collagen, lactalbumin, caseins and whey. These non-heat cogulable proteins can be used in either the first or second phase compositions employed in this invention.

To impart a desired viscosity and body to the first phase composition, a hydrocolloid which is either xanthan gum or locust bean gum, or a mixture thereof is added to the protein blend at levels within the range of about 0.05 to 3 weight percent of the composition. The desired viscosity, which is important to achieve, in the consumer the perception, of an oily texture and mouthfeel, is within the range of 30,000 to 1,000,000 centipose (measured at 40° F. 4° C.). It has been found that hydrocolloids, other than xanthan gum or locust bean gum, do not provide the satisfactory results desired.

The only starch used in the first phase composition of this invention is a particulate unmodified waxy maize starch of branched chain amylopectin polymer. A commercial product of this type is Amioca® starch, sold by Amaizo Company. The high amylopectin level in this starch sets it aside from regular starches and gives it certain characteristics which makes it particularly suitable as a stabilizer and thickening agent. The particle size of the starch granules to be used in the compositions of the present is preferably such as to permit 95±5 percent of the granules to pass through a 200 U.S. mesh screen.

The amount of starch in the finished product can range from about 3 to about 30 weight percent, and preferably about 5 to about 15 weight percent.

In order to make the most palatable sausage analogs according to this invention, it is preferred that the protein mix used therein in the first phase composition contain up to about 50 weight percent of an oil and/or fat and preferably from about 5 to about 30%. Fats utilized in forming the protein mix suitable for such use include liquid or semi-liquid glyceride shortening derived from animal, vegetable or marine fats and oils including synthetically prepared shortening. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucopyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl. These glycerides can be prepared by random or low temperature interesterification reactions of fatty triglyceride-containing oils and fats, such as interesterified or rearranged cottonseed oil and lard; and they can be otherwise formed by various organic syntheses.

The second phase composition of the Vienna sausage analog of the present invention comprises about 10 to about 50 weight percent of the finished product and is a fat release emulsion comprising at least about 65 weight percent, and preferably about 65 to about 75 weight percent, of vegetable oil. The same type of vegetable oil as is used in the first phase composition, can be used in the second phase. Also in the second phase, a non-vegetable protein such as albumen, casein and whey and combinations thereof can be used. The amount of non-vegetable protein to be used in the second phase composition ranges from about 5 to about 10 weight percent. The amount of water necessary to produce the desired fat release emulsions ranges from at least about 10 to about 30 weight percent, preferably about 10 to about 20 weight percent, of the fat release emulsion. The amount of salt present in the fat release emulsion can range from about 0.5 to about 2.5 weight percent while the amount of sugar can range from about 1.5 to about 3 weight percent of the emulsion.

Each of the two phases used in the sausage analog are mixed individually and then blended with each other to form the sausage analog product. This product can be stuffed into standard sized edible or non-edible casings, having a diameter of about 15 to 20 mm, heat set and frozen, if desired, to provide the desired finished sausage analog product.

To prepare the first phase composition, the mixed ingredients can be passed through a meat grinder fitted with a die, preferably ⅜", to obtain a substantially uniform heterogeneous distribution of the particulate material within the proteinaceous precursor.

The mixing, blending or folding of the ingredients used in the compositions of this invention can be conducted in standard mixers. The particles of the fat release emulsion phase which are dispersed in the continuous matrix phase should have a particle size of more than 25 microns.

A necessary component of the composition of this invention is water. The water content of the final product will be determined by the type of sausage product that is to be duplicated by the analog system. For example, the sausage analog, may be a dry, intermediate or wet sausage analog product. In this latter class of products, water contents of 42 to 74 percent have been found acceptable with an optimum range of 45 to 55 weight percent. However, these percentage figures are not to be considered limiting, since different types of sausage analogs may be produced with other levels of water content.

Most of any flavoring material commonly employed in meat, or to provide a meat like flavoring can be employed in the compositions of this invention. Prominent among these materials are hydrolyzed vegetable protein, artificial and natural meat flavoring, black pepper, white pepper, corriander, mace, nutmeg, rosemary, sugars, red pepper, sage, salt, monosodium glutamate, sodium caseinate, sodium guanylate and the like. The amounts used depend on the type of flavoring desired, and range from about 0.005% to about 3% for each flavor, based on the weight of the entire composition. The flavors can be added to either the first or second phase compositions.

It has been found that the emulsions of the present invention may also be used with natural meats as a meat extender.

To further illustrate the essential aspects of this invention, the following example is provided.

EXAMPLE

A Vienna sausage analog formed from two phases is prepared. The first phase is prepared in the following manner:

The following ingredients were used in the amounts designated in Table I below:

(1) The following ingredients were dry blended:

Amioca starch (a particulate unmodified waxy maize starch of branched chain amylopectin polymers), egg albumen, soy isolate, salt, sugar, hydrolyzed vegetable protein (HVP), frankfurter flavor, monosodium glutamate, garlic powder, mustard powder, paprika and ginger.

(2) The fat flavor was then cut into the dry blend (1) like shortening.

(3) The xanthan gum was dispersed in 40% of the water (temp=100° F.) and the resulting gum dispersion was cooled to 60° F.

(4) The remaining water, 60%, and colors (monascus red and grape skin extract) heated at 60° F. were added to the dry blend (1) and (2) and mixed. The xanthan gum dispersion (3) was added and the resulting mixture was admixed for one additional minute.

(5) The cottonseed oil, and smoke flavor were then added to mix (4). The oils were then first folded in and the resulting system was then emulsified under high shear.

| Typical Specifications for the Resulting Emulsion | |
|---|---|
| Viscosity | 20-25 B.U. |
| Density | 0.80-0.85 g/cc |
| Temperature | 72-78° F. |
| Emulsion drop size | 5-25 microns |

The viscosity is measured under the following conditions: Brookfield H.A.T. 5 r.p.m., T-B Bar 36.6 mm, factor 160M=cps.

(6) The system was partially deaerated.

| Typical Specifications for Deaerated Emulsion of the Continuous Phase | |
|---|---|
| Viscosity | 17-24 B.U. |
| Density | 0.90-0.95 g/cc |
| Temperature | 70-75° F. |

TABLE I

| First Phase Composition | |
|---|---|
| Ingredients | Wt. % |
| Water | 49.613 |
| Winterized Cottonseed Oil | 17.330 |
| Amioca Starch | 10.546 |
| HVP | 0.665 |
| Egg White | 8.500 |
| Soy Isolate | 5.021 |
| Salt | 2.071 |
| Sugar | 1.916 |
| Smoke Flavor | 1.832 |
| Fat Flavor | 1.126 |
| Hot Dog Flavor | 0.363 |
| Monosodium Glutamate | 0.124 |
| Garlic Powder | 0.015 |
| Mustard Powder | 0.015 |
| Paprika | 0.008 |
| Ginger | 0.008 |
| Xanthan Gum | 0.495 |
| Monascus Red | 0.326 |
| Anthocyanin | 0.026 |
| Grape Skin Extract | 0.024 |

The second phase of the sausage analog is prepared in the following manner with the amounts of the ingredients indicated in Table II below:

(1) Egg white (NOSLS*), HVP, salt, sugar, Hot Dog Flavor, gelatin, smoke flavor and pepper are dry blended for 5 minutes at speed 1 in a 5-quart Hobart mixer.
*No sodium Lauryl Sulfate (2) Water at (110° F.) is added to the dry mix of step (1) and mixed for 15 minutes at speed 1.

(3) Cottonseed oil was heated to 110° F. and added slowly to the powder/water mix of step (2) (over two minutes) while the mixer is going at speed 1. After all the oil has been added, mixing was continued for an additional 30 seconds at speed 1.

| Physical Properties of Fat Release Emulsion | |
|---|---|
| Temperature | 90° F. ± 5° F. |
| Viscosity | 45 ± 10 B.U. |
| Density | 0.94 ± 0.10 |
| Emulsion Drop Size | 5-25 microns |

TABLE II

| Fat Release Formula | |
|---|---|
| Ingredients | Wt. % |
| Water | 13.265 |
| Winterized Cottonseed Oil | 69.239 |
| HVP | 1.415 |
| Egg White | 8.144 |
| Salt | 0.975 |
| Sugar | 2.170 |
| Hot Dog Flavor | 3.842 |
| Gelatin | 0.698 |
| Smoke Flavor | 0.190 |
| Pepper | 0.062 |

The ingredients described in Table I, as phase 1, and the ingredients described in Table II, as phase 2, are gently folded together to achieve a blend, in the form of a continuous matrix, to provide a Vienna sausage analog product which is stuffed into 17 millimeter collagen casings which are 3⅜" in length. The stuffed casings are linked into links of about 21 grams per link. The casings were heat set in a dryer under the following conditions:
Wet Bulb/Dry Bulb
140° F./160° F. 20 minutes 180° F./192° F. 25 minutes.

The resulting product was cooled at room temperature, packaged and frozen.

The Vienna sausage analog produced had the following composition based on the weight percents of the components used therein, based on the total weight percent of the finished product, as indicated in Table III below.

TABLE III

| | Wt. % Continuous Matrix 1st Phase | Wt. % Fat Release 2nd Phase | Wt. % TOTAL |
|---|---|---|---|
| Water | 34.734 | 3.978 | 38.712 |
| Cottonseed Oil | 12.132 | 20.766 | 32.898 |
| Amioca Starch | 7.382 | — | 7.382 |
| Egg Albumen | 5.950 | 2.443 | 8.393 |
| Soy Isolate | 3.515 | — | 3.515 |
| Salt | 1.450 | 0.293 | 1.743 |
| Sugar | 1.342 | 0.651 | 1.993 |
| Smoke Flavor | 1.283 | — | 1.283 |
| Fat Flavor | 0.788 | — | 0.788 |
| HVP | 0.465 | 0.424 | 0.889 |
| Xanthan Gum | 0.347 | — | 0.347 |
| Frankfurter Flavor | 0.254 | 1.152 | 1.406 |
| Monascus Red | 0.228 | — | 0.228 |
| Monosodium Glutamate | 0.087 | — | 0.087 |
| Garlic Powder | 0.011 | — | 0.011 |
| Mustard Powder | 0.011 | — | 0.011 |
| Paprika | 0.006 | — | 0.006 |
| Ginger | 0.006 | — | 0.006 |
| Grape Skin Extract | 0.018 | — | 0.018 |
| Gelatin 250 Bloom | — | 0.209 | 0.209 |
| Smoke Flavor | — | 0.057 | 0.057 |
| Pepper | — | 0.018 | 0.018 |
| TOTAL | 70.009 | 29.991 | 100.000 |

The Vienna sausage analog produced as described above has significant improvements in juiciness, snap and flavor over a comparative Vienna sausage analog made by using only the first phase as the total ingredients thereof. Furthermore, the sausage analog product of this invention has tenderness, cohesiveness, and chewiness characteristics approaching an all meat sausage or frankfurter product.

The most preferred composition for the first phase of the sausage analog of this invention is as follows:

| Ingredients | Weight % |
|---|---|
| Starch | about 10 to about 11 |
| Protein | about 13 to about 14 |
| Gum | about 0.4 to about 0.6 |
| Oil | about 15 to about 19 |
| Water | about 45 to about 55 |
| Salt | about 1 to about 3 |
| Sugar | about 1 to about 3 |

The remainder is other flavoring ingredients.

The most preferred composition for the second phase or fat release emulsion of the sausage analog of this invention is as follows:

| Ingredients | Weight % |
|---|---|
| Vegetable Oil | about 65 to about 75 |
| Non-vegetable Protein | about 5 to about 10 |
| Sugar | about 1.5 to about 3 |
| Salt | about 0.5 to about 2.5 |
| Water | at least about 10 |

The remainder is other flavoring ingredients.

It should be noted that if all the ingredients used in the two phases for the sausage analogs of the present invention were blended together in one operation, rather than blending them in two separate phases as described above, a satisfactory product is not obtained.

Many variations and modifications of the present invention will be apparent to those skilled in the art upon reading the above disclosure. It is intended that all such modifications and variations be included within the scope of the invention.

What is claimed is:

1. An improved Vienna sausage meat analog product approximating the juiciness and tenderness properties of an all meat product and comprising a dispersion of about 10 to about 50 weight percent of a fat release emulsion phase dispersed in about 50 to about 90 weight percent of a continuous matrix phase, said continuous matrix phase comprising water, protein within the range of from about 5 to about 50 weight of the matrix phase said protein including an edible heat coagulable proteinaceous material, a hydrocolloid within the range of from about 0.05 to 3 weight percent selected from the group consisting of xanthan gum and locust bean gum, and mixtures thereof, a particulate unmodified waxy maize starch of branched chain amlyopectin polymers within the range of from about 3 to about 30 weight percent and a liquid or semi-liquid fat at a level of up to about 50 weight percent, said fat release emulsion phase comprising at least about 65 weight percent of vegetable oil, water within the range of from about 10 to about 30 weight percent, and a non-vegetable protein within the range of from about 5 to about 10 weight percent selected from the group consisting of albumin, casein and whey and mixtures thereof, said dispersion being stuffed into an edible or non-edible casing and heat set to produce an improved Vienna sausage meat analog.

2. The product of claim 1 wherein the hydrocolloid is xanthan gum.

3. The product of claim 1 wherein the hydrocolloid locust bean gum.

4. The product of claim 1 wherein the edible heat coagulable proteinaceous material comprises egg albumen and a vegetable protein.

5. The product of claim 4 wherein, in the matrix phase, the fat is a vegetable oil.

6. The product of claim 5 wherein, in the matrix phase, the vegetable protein is soy isolate.

7. The product of claim 6 wherein, in the fat release emulsion phase, the oil is cottonseed oil.

8. The product of claim 7 wherein the matrix phase, contains salt, sugar and other flavoring materials.

9. A Vienna sausage meat analog product as in claim 2 wherein said fat release emulsion phase comprises in weight percent: about 65 to about 75 percent vegetable oil; about 5 to about 10 percent egg albumen; about 0.5 to about 2.5 percent salt; about 1.5 to about 3 percent sugar; and the remainder other flavoring materials.

10. A Vienna sausage meat analog product as in claim 8 wherein said fat release emulsion phase comprises. in weight percent: about 65 to about 75 percent cottonseed oil; about 5 to about 10 percent egg albumen; about 0.5 to about 2.5 percent salt; about 1.5 to about 3 percent sugar; and the remainder other flavoring materials.

11. A Vienna sausage meat analog product as in claim 9 wherein said fat release emulsion phase, has the following properties at 95°±5° F.:

Viscosity of about 45±10 B.U.,

Density of about 0.94±0.10 g/cc.

12. A Vienna sausage meat analog product as in claim 10 wherein said fat release emulsion phase has the following properties at 95°±5° F.:

Viscosity of about 45±10 B.U.,

Density of about 0.94±0.10 g/cc.

* * * * *